US006904042B2

(12) United States Patent
Krug et al.

(10) Patent No.: US 6,904,042 B2
(45) Date of Patent: Jun. 7, 2005

(54) NETWORK COUPLING DEVICE AND DATA NETWORK WITH NETWORK COUPLING DEVICE

(75) Inventors: Wilfried Krug, Witten (DE); Michael Winkelmann, Bochum (DE)

(73) Assignee: Siemens Aktiengesellschaft, Munich (DE)

( * ) Notice: Subject to any disclaimer, the term of this patent is extended or adjusted under 35 U.S.C. 154(b) by 839 days.

(21) Appl. No.: 09/755,683

(22) Filed: Jan. 5, 2001

(65) Prior Publication Data

US 2001/0006524 A1 Jul. 5, 2001

(30) Foreign Application Priority Data

Jan. 5, 2000 (DE) .......................................... 100 00 237

(51) Int. Cl.[7] .............................................. H04L 12/28
(52) U.S. Cl. ......................... 370/401; 370/463; 370/466
(58) Field of Search ................................ 370/401, 463, 370/466, 412, 389, 392

(56) References Cited

U.S. PATENT DOCUMENTS

| 5,610,905 | A | * | 3/1997 | Murthy et al. .............. 370/401 |
| 5,818,821 | A | | 10/1998 | Schurig |
| 5,970,069 | A | * | 10/1999 | Kumar et al. ............... 370/402 |
| 6,324,178 | B1 | * | 11/2001 | Lo et al. ...................... 370/392 |
| 6,366,583 | B2 | * | 4/2002 | Rowett et al. .............. 370/401 |
| 6,411,625 | B1 | * | 6/2002 | Furuhashi et al. ..... 370/395.53 |
| 6,507,573 | B1 | | 1/2003 | Lukanek et al. |
| 6,539,020 | B1 | * | 3/2003 | Sabey et al. ................ 370/401 |
| 6,614,782 | B1 | * | 9/2003 | Wehrend et al. ........... 370/352 |
| 6,636,519 | B1 | * | 10/2003 | Walsh et al. ................ 370/401 |
| 2002/0186705 | A1 | * | 12/2002 | Kadambi et al. ........... 370/452 |
| 2004/0052268 | A1 | * | 3/2004 | Lewin et al. ................ 370/430 |

FOREIGN PATENT DOCUMENTS

| DE | 197 14 386 C1 | 10/1998 |
| WO | WO 98/47267 | 10/1998 |

OTHER PUBLICATIONS

Jeffrey C. Smith: "The SARAM™ (Sequential Access and Random Access MEmory), A New Kind of Dual–Port Memory for Communications Now and Beyond", WESCON '93, San Francisco, California, Sep. 28–30, 1993, conference record, pp. 571–579.
Amitava Dutta–Roy: "Networks for Homes", *IEEE Spectrum, Dec. 1999, pp. 26–33*.
John Ogutu Onunga et al.: "Personal Computer Communications on Intrabuilding Power Line LAN's Using CSMA with Priority Acknowledgements", *IEEE Journal on Selected Areas in Communications*, vol. 7, No. 2, Feb. 1989, pp. 180–191.
Son T. Vuong et al.: "A Low–Cost and Portable Local Area Network for Interconnecting PC's Using Electric Power Lines", *IEEE Journal on Selected Areas in Communications, vol. 7, No. 2, Feb. 1989, pp. 192–201*.
Andrew S. Tanenbaum: "Computer Networks", *Prentice–Hall International, Inc.*, 3rd edition, 1996, pp. 396–412.
Randrianalimanana Pax: "Repeater Between Home Systems Coaxial Cable And Twisted PAir Media", IEEE Transactions on Consumer Electronics, vol. 41, Aug. 1995, No. 3, pp. 890–892, XP 000539551.

* cited by examiner

*Primary Examiner*—Ricky Ngo
*Assistant Examiner*—Rhonda Murphy
(74) *Attorney, Agent, or Firm*—Laurence A. Greenberg; Werner H. Stemer; Ralph E. Locher

(57) ABSTRACT

For the flexible linking-up of a so-called home network to further data networks, a network coupling device, with which the home network can be coupled to a local area network, is provided. The network coupling device couples the two data networks on the data link layer of the OSI reference model and is consequently transparent with respect to all the higher protocol layers. The transparent coupling to a local area network provides the home network with access to the entire infrastructure of the local area network, and to all the further data networks accessible from the latter, without any additional expenditure.

9 Claims, 1 Drawing Sheet

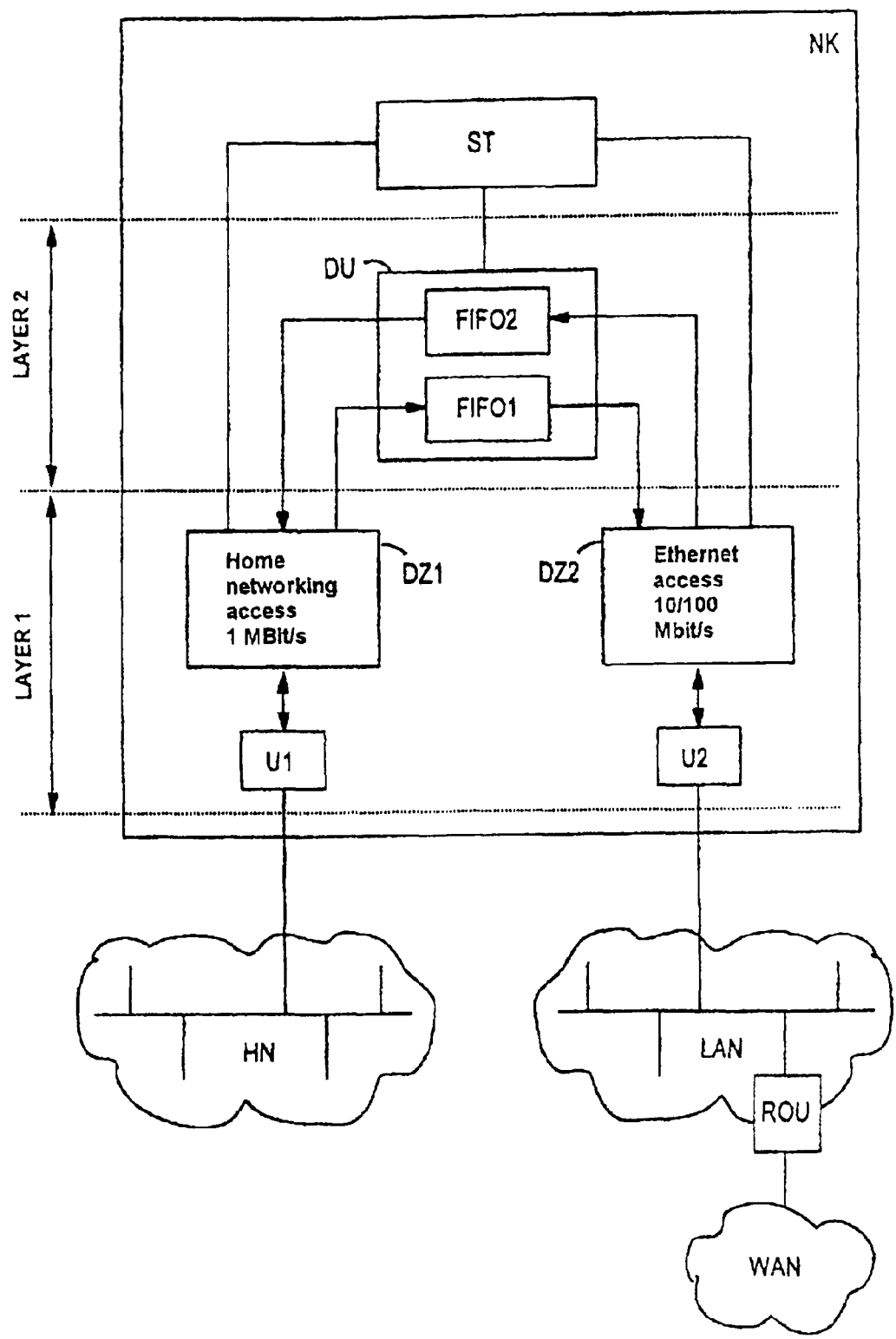

NETWORK COUPLING DEVICE AND DATA NETWORK WITH NETWORK COUPLING DEVICE

BACKGROUND OF THE INVENTION

1. Field of the Invention

The invention relates to a network coupling device for a so-called home network, i.e. for a data network which uses cabling actually intended for other purposes, such as for example existing telephone cabling or power supply cabling, as a transmission medium. The invention also relates to a home network with this network coupling device.

For connecting up a number of data processing devices, in particular in the home area, currently a technique referred to as home networking is widely used. This technique involves the coupling of data processing devices by use of already existing cabling actually intended for other purposes. Since already existing cabling is used, such as for example domestic telephone and/or power supply cabling, no additional laying of connecting cables is required for connecting up data-processing systems within the range of the existing cabling.

For data transmission between the data processing devices connected up in this way, data packets to be transmitted are coded into signals outside a frequency range used for the actual intended purpose of the cabling and are fed into the cabling. In home networking via existing telephone cabling, for example, a frequency range not used by the telephone service of 5.5 MHz to 9.5 MHz is used for the transmission of data packets, so that telephone conversations simultaneously conducted via the telephone line are not adversely affected by this.

If a direct connection of the telephone line of a building, for example to an Internet service provider, exists, and this connection does not exceed a prescribed length, a home network can be linked up to other communication networks, such as for example the Internet, without additional devices being interposed by a user. However, on account of a relatively short range of the home network, this possibility often does not exist. This is particularly the case if the telephone cabling of a building networked in this way is connected to the public network via a commercially available switching system, such as for example a private branch exchange. The signals fed into the telephone cabling in the course of home networking are generally not transmitted into the public network by a commercially available switching system.

A generally applicable method of coupling a home network to a higher-level communications network is to connect a specific modem between the home telephone cabling and a public network, which carries out a conversion between a home network protocol and an integrated systems digital network (ISDN) protocol. However, a link-up via a specific modem has little flexibility, in particular with regard to relatively complex network structures.

As an alternative to this, a gateway computer with an ISDN plug-in card and a home-network plug-in card may be used together with associated routing software for the linking up of a home computer. However, this requires very high expenditure on hardware and protocol.

SUMMARY OF THE INVENTION

It is accordingly an object of the invention to provide a network coupling device and a data network with the network coupling device that overcomes the above-mentioned disadvantages of the prior art devices of this general type, With the foregoing and other objects in view there is provided, in accordance with the invention, a network coupling device for coupling a data network to a local area network. The network coupling device contains functional components operating on a physical layer of an open system interconnect (OSI) reference model. The functional components include a first data access device, to be coupled to cabling of the data network, for extracting data packets from the cabling and for feeding the data packets into the cabling, while avoiding adverse effects on an actual intended purpose of the cabling. And a second data access device, to be coupled to a transmission medium of the local area network, for extracting the data packets from the local area network and for feeding the data packets into the local area network. A data transmission device is provided which operates on a data link layer of the OSI reference model and is coupled to the first data access device and to the second data access device. The data transmission device provides an unchanged transmission of extracted data packets between the first data access device and the second data access device without evaluating addressing information concerning the data link layer contained in the data packets.

It is the object of the present invention to specify a network coupling device for a home network which allows flexible linking up of the home network to further data networks with low expenditure. Furthermore, a home network that can be connected to the further data networks flexibly and with low expenditure is to be specified.

For linking up the home network to one or more further data networks, the home network is to be coupled to a local area network by the network coupling device according to the invention. A local area network is often also referred to as a LAN, and can be realized for example as a so-called Ethernet, token-ring network, token-bus network or FDDI network, or as a combination of these. The linking up of the home network to a local area network allows the existing infrastructure of the latter to be used without any restrictions in principle. Since powerful local area networks with well-developed infrastructure are already installed in many locations, in many cases the range of applications of the home network can be considerably expanded with low expenditure by the network coupling device according to the invention. Many local area networks are, moreover, already coupled to higher-level data networks, such as for example a wide area network (WAN), a metropolitan area network (MAN) and/or the Internet, via existing router or gateway devices. The linking up of the home network to a local area network linked up in such a way makes these higher-level data networks also accessible for the home network. The network coupling device according to the invention allows a home network and a local area network to be directly connected. High-expenditure interposing of a computer with an Ethernet card, home-networking card and corresponding router software is not required.

The network coupling device according to the invention has the effect that the home network and a local area network are coupled on a data link layer, i.e. on a protocol layer-2, of the OSI reference model and consequently transparently with respect to all the higher protocol layers of the OSI reference model. The transparency of the coupling with respect to the higher protocol layers is very advantageous, in particular with regard to the increasing multitude of network data services, since no service-specific protocol conversion is required in the case of this coupling. The home network consequently has full access to the infrastructure of a local area network, and consequently to the further data networks accessible from the local area network, without any additional expenditure.

The network coupling device according to the invention can be realized with particularly low expenditure on hardware and protocol, since no evaluation of address information concerning the data link layer takes place in the data link layer. In particular, the network coupling device according to the invention has no filtering function like a customary bridge used for the coupling of data networks. In the course of such a filtering function, for every received data packet it is established from its layer-2 address in which data network the transmission destination of the data packet is located. A bridge with a filtering function transports the data packet only if the transmission destination is not located in the data network of the sender of the data packet.

To realize such a filtering function, however, an address table in which the layer-2 addresses of received data packets are stored and which constantly has to be updated must be managed by a bridge. This expenditure is not required in the case of the network coupling device according to the invention.

According to an advantageous embodiment of the invention, a buffer memory may be provided in order to buffer-store data packets extracted from the home network or the local area network until they are fed into the other data network, respectively. Such a buffer memory may serve in particular for adapting different data transmission rates in the home network and the local area network. In this way, extracted data packets can be buffer-stored until they are completely received, in order for them subsequently, for example in response to a call, to be fed into the other data network, respectively, at the transmission rate of the latter. A so-called first-in-first-out memory, operating on the feed-through principle, may be advantageously used as the buffer memory. Preferably, the buffer memory may be realized as a so-called dual-port random access memory (PAM).

To increase the data throughput, a dedicated buffer memory may also be respectively provided both for the transmission direction from the home network to the local area network and for the opposite direction.

In accordance with an added feature of the invention, the data network is a telephone system and the first data access device is provided for extracting the data packets from the cabling of the telephone system and for feeding the data packets into the cabling.

In accordance with an additional feature of the invention, the cabling is power supply cabling and the first data access device is provided for extracting data packets from the power supply cabling and for feeding the data packets into the power supply cabling.

In accordance with another feature of the invention, the data transmission device has a buffer memory for buffer-storing the extracted data packets before their transmission to one of the first data access device and the second data access device.

In accordance with a further feature of the invention, the buffer memory is a first-in-first-out memory or a dual-port random access memory.

In accordance with another added feature of the invention, the data transmission device has, for a transmission direction from the first data access device to the second data access device and for an opposite transmission direction, a buffer memory for buffer-storing the data packets to be transmitted in a direction concerned.

In accordance with another additional feature of the invention, the first data access device, the second data access device and the data transmission device form an integrated chip.

With the foregoing and other objects in view there is provided, in accordance with the invention, a data network for transmitting data between a first data processing device and a second data processing device through cabling actually intended for other purposes. The data network contains a network coupling device having functional components operating on a physical layer of an open system interconnect (OSI) reference model. The function components include a first data access device, to be coupled to the cabling of the first data processing device, for extracting data packets from the cabling and for feeding the data packets into the cabling, while avoiding adverse effects on an actual intended purpose of the cabling of the first data processing device; and a second data access device, to be coupled to a transmission medium of the second data processing device, for extracting the data packets from the second data processing device and for feeding the data packets into the second data processing device. A data transmission device is provided for operating on a data link layer of the OSI reference model and is coupled to the first data access device and to the second data access device. The data transmission device provides an unchanged transmission of extracted data packets between the first data access device and the second data access device without evaluating addressing information concerning the data link layer contained in the data packets.

Other features which are considered as characteristic for the invention are set forth in the appended claims.

Although the invention is illustrated and described herein as embodied in a network coupling device and a data network with the network coupling device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block diagram of a network coupling device coupling a home network and a local area network according to the invention.

DESCRIPTION OF THE PREFERRED EMBODIMENTS

Referring now to the single FIGURE of the drawing in detail, there is shown a network coupling device NK, which is coupled to a home network HN and a local area network LAN. In the present exemplary embodiment, the home network HN is realized as a so-called phone line network, i.e. as a data network which uses existing telephone cabling as a transmission medium. For data transmission via such a phone line network, a frequency range not generally used by telephone systems of 5.5 MHz to 9.5 MHz is used. In this case, a data transmission rate of 1 Mbit/s can be achieved. The local area network LAN is configured in the present exemplary embodiment as a so-called Ethernet, which usually provides a data transmission rate of 10 Mbit/s or 100 Mbit/s. The local area network LAN is coupled to a wide area network WAN via a router device ROU.

The network coupling device NK has, as functional components operating on the physical layer, i.e. layer 1, of an open system interconnect (OSI) reference model, a data access module DZ1 for physical access to the home network HN and a data access module DZ2 for the physical access to the local area network LAN. The data access module DZ1 is in this case connected to the home network HN via a transmitter/transformer U1 and the data access module DZ2 is connected to the local area network LAN via a transmitter/transformer U2. Furthermore, the network coupling device NK contains, as a functional component operating on the data link layer, i.e. on layer 2, of the OSI reference model, a data transmission device DU formed of buffer memories FIFO1 and FIFO2. The assignment of the functional components to protocol layers is illustrated in the FIGURE by dotted limiting lines.

The buffer memories FIFO1 and FIFO2 are realized as so-called first-in-first-out memories, operating on the feed-through principle, and are respectively connected both to the data access module DZ1 and to the data access module DZ2. The buffer memory FIFO1 serves in this case for buffer-storing data to be transmitted from the data access module DZ1 to the data access module DZ2, while the buffer memory FIFO2 serves for buffer-storing data to be transmitted in the opposite direction. The network coupling device NK additionally has a control module ST, which is connected to the data access modules DZ1 and DZ2 and also to the data access device DU for control purposes. The control module ST may, for example, take the form of a microcontroller with an EEPROM for storing associated firmware or as a digital signal processor.

The transmitters U1 and U2 serve essentially for the coupling of carrier signals used for data transport into and out of the respective physical transmission medium and for the level adaptation required for this purpose. In the case of the home network HN, the useful data to be transmitted are modulated onto a carrier signal between 5.5 MHz and 9.5 MHz, which is coupled out and fed in by the transmitter U1. A conversion between the carrier signals coupled out and carrier signals to be fed in by the transmitters U1 and U2, respectively, and a data packet interface to the data link layer is carried out by the data access modules DZ1 and DZ2. The data access modules DZ1 and DZ2 have in this case in particular the task of detecting or generating preambles of layer-1 data packets and of detecting collisions of layer-1 data packets on the transmission medium. The different types of modulation and frame structures of the layer-1 data packets in the home network HN and the local area network LAN are adapted to one another by the data access modules DZ1 and DZ2.

A data packet transmitted in the home network HN is consequently passed on by the transmitter U1 to the data access module DZ1, which detects the data packet as a layer-1 data packet on the basis of its preamble and converts it into a data packet of the data link layer. The data access module DZ1 then signals its readiness to read out the detected data packet to the control module ST. As a consequence, the latter makes the buffer memory FIFO1 buffer-store the data packet until it is completely received. Once the data packet has been completely received, it is transmitted at the instigation of the control module ST out of the buffer memory FIFO1 to the data access module DZ2 and from there via the transmitter U2 into the local area network LAN at a rate adapted to the higher transmission rate of the latter.

In the transmission of data packets between the layer-1 data access modules DZ1 and DZ2, no evaluation of addresses concerning the data link layer, the so-called medium access control (MAC) addresses, is carried out on the data link layer. The data packets are to a certain extent copied only with brief buffer storage. Dispensing with address evaluation in the data link layer allows significant simplification of the circuitry of the network coupling device NK. This saving is made possible by the transmission protocols used in a home network HN on the one hand and a local area network LAN on the other hand being largely similar.

A transmission of data packets from the local area network LAN via the network coupling device NK to the home network HN takes place in a way analogous to the transmission explained above, in the opposite direction. For this purpose, the carrier signal of the data packets transmitted in the local area network LAN is coupled out by the transmitter U2 and fed to the data access module DZ2. The latter converts the data packets transported by the carrier signal into layer-2 data packets. At the instigation of the control module ST, these are buffer-stored in the buffer memory FIFO2 until they are called by the data access module DZ1. The calling of the data packets is in this case controlled in turn by the control module ST. Since the data transmission rate of the home network HN is significantly lower than that of the local area network LAN, the data packets are read out significantly more slowly from the buffer memory FIFO2 than they are stored into it. The buffer memory FIFO2 consequently serves in particular as a buffer memory for adapting the different data transmission rates in the home network HN and local area network LAN.

The unchanging transmission of data packets on the data link layer has the effect that the home network HN and local area network LAN are transparently coupled with regard to all the higher protocol layers, i.e. from layer 3 inclusive. From the viewpoint of all the higher protocol layers, the home network HN and the local area network LAN consequently appear as a common data network. A major advantage in this context is that the data link layer has a uniform interface with respect to the next-higher protocol layer, the network layer. This interface is consequently protocol-independent and media-neutral. The home network HN can, on account of its transparent coupling to the local area network LAN, use the entire infrastructure of the latter and, in particular, the link-up of the latter to the wide area network WAN in a simple way. On account of the simple structure of the network coupling device NK, it can also be integrated particularly advantageously in a chip.

We claim:

1. A network coupling device for coupling a home network to a local area network, the network coupling device comprising:

functional components operating on a physical layer of an open system interconnect (OSI) reference model, including:

a first data access device, to be coupled to cabling of the home network, for extracting data packets from the cabling and for feeding data packets into the cabling, while avoiding adverse effects on an actual intended purpose of the cabling; and a second data access device, to be coupled to a transmission medium of the local area network, for extracting data packets from the local area network and for feeding data packets into the local area network; and a data transmission device operating on a data link layer of the OSI reference model and coupled to said first data access device and to said second data access device, said data transmission device providing an unchanged transmission of extracted data packets between said first data access device and said second data access device without evaluating addressing information concerning the data link layer contained in the data packets.

2. The network coupling device according to claim 1, wherein the cabling is a cabling of a telephone system and said first data access device is provided for extracting data packets from the cabling of the telephone system and for feeding data packets into the cabling of the telephone system.

3. The network coupling device according to claim 1, wherein the cabling is a power supply cabling and said first data access device is provided for extracting data packets from the power supply cabling and feeding data packets into the power supply cabling.

4. The network coupling device according to claim 1, wherein said data transmission device has a buffer memory for buffer-storing the extracted data packets before their transmission to one of said first data access device and said second data access device.

5. The network coupling device according to claim 4, wherein said buffer memory is a first-in-first-out memory.

6. The network coupling device according to claim 4, wherein said buffer memory is a dual-port random access memory.

7. The network coupling device according to claim 1, wherein said data transmission device has, both for a transmission direction from said first data access device to said second data access device and for an opposite transmission direction, a respective buffer memory for buffer-storing the data packets to be transmitted in a direction concerned.

8. The network coupling device according to claim 1, wherein said first data access device, said second data access device and said data transmission device form an integrated chip.

9. A home network for transmitting data between a first data processing device and a second data processing device through cabling actually intended for other purposes, comprising:

a network coupling device, containing:
functional components operating on a physical layer of an open system interconnect (OSI) reference model, said functional components including:
a first data access device, to be coupled to the cabling of the home network, for extracting data packets from the cabling and for feeding data packets into the cabling, while avoiding adverse effects on an actual intended purpose of the cabling; and
a second data access device, to be coupled to a transmission medium of a local area network, for extracting data packets from the local area network and for feeding data packets into the local area network; and
a data transmission device operating on a data link layer of the OSI reference model and coupled to said first data access device and to said second data access device, said data transmission device providing an unchanged transmission of extracted data packets between said first data access device and said second data access device without evaluating addressing information concerning the data link layer contained in the data packets.

* * * * *